2,745,812
Patented May 15, 1956

2,745,812

PREPARATION OF A CATALYST USING A METAL SOAP OF A CARBOXYLIC ACID AS AN ADSORBATE

Herman E. Ries, Jr., Chicago, Ill., assignor to Sinclair Refining Company, New York, N. Y., a corporation of Maine No Drawing. Application April 11, 1950,
Serial No. 155,367

6 Claims. (Cl. 252—455)

This invention relates to pyrolytic conversion of hydrocarbons and more particularly to the preparation of monomolecular layer catalysts and their use in such processes.

This application is a continuation in part of my co-pending applications Serial Nos. 751,117 and 751,118, filed May 28, 1947, both now abandoned.

In the conversion of hydrocarbon base stocks to produce products having desired properties, such as high octane number, for use in gasoline, the stock is submitted to one of several processes, such as cracking, hydrogenation, dehydrogenation, or reforming in the presence of a catalyst adsorbed on a carrier.

My catalyst is a supported metal or metal oxide type catalyst which is characterized structurally by a monomolecular layer of the metallic catalyst material on an adsorptive carrier surface. In the conventional method of preparing metal or metal oxide catalysts supported on a carrier, such as ordinary impregnation from aqueous medium, uneven deposits with aggregates of crystalline structure are built up.

My invention provides a method for overcoming the deficiencies inherent in the conventional methods of preparing such type catalysts. I produce a catalyst consisting of a true monomolecular layer of a metallic catalyst deposited on an adsorptive carrier. By my method I obtain control of film deposition, layer thickness and molecular orientation and spacing for optimum interaction. I accomplish this by depositing a monomolecular layer of a metallic catalyst on an adsorptive carrier by adsorption from a solution of the salt of the catalytic metal or metal oxide with an organic, high molecular weight acid, e. g. aluminum stearate, and then treating the deposited material to remove the organic portion of the molecule. The adsorbate must be a surface active type compound having a long hydrocarbon portion in conjunction with a polar group such as the stearate radical. Then adsorption from solution occurs by building up an oriented layer of molecules with the polar groups being adsorbed and the long hydrocarbon portions protecting the layer against aggregation. On the other hand, simple salts such as aluminum nitrate or aluminum acetate build up small aggregations of small crystals in an unoriented pattern over the adsorptive surface. Organic, high molecular weight soaps having long chains are essential, for if the chains were not long, random multilayer deposition would take place and the advantages of the monomolecular layer structure lost. These advantages include minimum quantity of catalytic material required and maximum benefit from catalyst-support interaction forces for yielding active sites. My method makes possible the controlled deposition and spacing of the catalyst molecules as regulated by the size and shape of the organic portion of the monomolecular layer molecule.

The general procedure for preparing the monomolecular layer catalysts of my invention, for example, alumina-silica, magnesia-silica, chromium on silica platinum or palladium on silica or alumina, cobalt on magnesia and diatomaceous earth, nickel on silica, is as follows: The soap of the metal or metal oxide to be deposited on the carrier is dissolved in a suitable solvent, e. g., aluminum mononaphthenate in benzene. The soap solution is then introduced into a chamber containing the support, e. g., high area silica. After adsorption equilibrium is reached, the catalyst is filtered out, dried and then treated to remove the organic portion of the molecule.

This latter treatment may be accomplished by calcining, which decomposes the organic portion of the soap molecules and leaves the monomolecular layer of metal oxide, e. g., alumina, properly spaced on the support surface. The chamber in which the catalyst is deposited on the high area silica may be advantageously operated under vacuum so as to de-gas the silica before deposition of catalyst monomolecular layer.

In place of the calcination method for removing the organic portion of the soap molecules, it may be advisable in some cases to use hydrogen reduction (hydrogen, 650–700° F., 4 hours; evacuation, 700° F., 1 hour). This method makes possible the recovery of the organic material which is distilled off. Removal of the hydrocarbon portion of the adsorbate also may be effected by controlled cracking in an inert atmosphere, e. g., at about 900° F. with nitrogen or flue gas, followed by gentle oxidation of the carbon deposited, e. g., about 1 per cent oxygen in nitrogen at about 800° F.–900° F. The cracking procedure has the advantage of avoiding localized high temperatures within the structure since the cracking reaction is endothermic. In general, mild and controlled temperatures are desirable in removing, or decomposing, or in effecting oxidation of adsorbate metals in view of the monomolecular thickness of the adsorbed layer.

The monomolecular layer may be deposited on a large pore aerogel type structure, in order to improve access of the adsorbate to the internal structure of the adsorptive base. Also where the structure will not be too extensively rearranged through further sizing and grinding operations, the adsorption may be effected on partially dried, sized hydrogel. The catalyst, in this case, following the treatment to remove the organic portion of the soap molecules, may be contacted with water for about one hour at room temperature to shrink it to a denser xerogel type and then redried. Advantageously, however, a material which has been washed with water containing a small amount of a surface tension reducing agent so as to reduce pore contraction in drying and calcining, as described in Erickson application Serial No. 141,169, filed January 28, 1950, now abandoned, may be employed for this purpose.

Preparation of my monomolecular layer catalysts is illustrated by the following examples:

Example I

Depositions of aluminum mononaphthenate from benzene solution, said solution containing approximately 1 gram of soap per 100 cc. of solvent, onto silica aerogel and silica xerogel, were effected in the following manner to produce my monomolecular layer catalyst: Following an overnight de-gassing of the high area silica (660° F., $10^{-4}$ mm. Hg), the soap solution was introduced and then agitated at frequent intervals for four days. The catalyst was removed by filtration, dried at a temperature of 230° F. for one hour and calcined at 1050° F. for two hours. The aluminum mononaphthenate employed was a commercial product containing about 10 per cent aluminum by weight and having 5 carbon atoms in the ring and 9 carbon atoms in the side chain.

Example II

A monomolecular layer catalyst was prepared in a manner similar to that in Example I, but by depositing aluminum monostearate from a very dilute carbon tetrachloride solution onto silica xerogel which had not been evacuated. Although the concentration of metal in the monomolecular layer appears to be a function of the concentration of soap in the solvent in batch treating or a multiple factor thereof in repeated contacting, the concentration adsorbed from the dilute carbon tetrachloride solution was good. It may be that the thin layer of adsorbed water present on the unevacuated carrier was effective in promoting oriented adsorption.

*Example III*

A monomolecular layer catalyst was prepared by slowly passing an aluminum monostearate-benzene solution down a column of silica xerogel, followed by drying and calcining as set forth in Example I. This method facilitates the use of greater quantities of solution at maximum concentration.

The silica xerogel and the silica aerogel used in the examples were both high area structures (800 sq. m./g.) prepared conventionally in granular form. The former had a pore radius of approximately 11 A. and the latter 100 A.

I have found benzene to be the best soap solvent, although related aromatic solvents, carbon tetrachloride and petroleum fractions (e. g., Stoddard's solvent), for example are useful. Soap solubilities in general decrease as follows: naphthenate, linoleate, oleate and stearate. The soap solubility is limiting to the extent that repeated contacting may be required with the soaps and solvents of lower mutual solubility to obtain the desired concentrations of monomolecular layer materials. The work shown in the foregoing examples was performed at room temperature with solutions in the range from 1 per cent to 2 per cent. However, solubility is increased with the temperature; thus the common soaps of aluminum and magnesium are soluble to the extent of about 5 per cent to 6 per cent in the above-named solvents at 160–180° F. without gelling.

The process of my invention may be applied to preparation of monomolecular catalysts of materials in various forms; e. g., microspheres, granules, beads or pellets, which are suitable for handling in fluidized, suspension or bed-type systems. The new catalysts have relatively good permeability and internal accessibility, perhaps due to the surface tension reducing effect of the adsorbate which reduces shrinkage of the structure when subjected to heat in the organic removal step in the manner described in Erickson application Serial No. 141,169, filed January 28, 1950. The monomolecular layer catalysts have valuable activity in hydrocarbon conversion processes of the type accelerated or improved by reaction on an adsorptive surface, and show good regenerability where carbonaceous matter deposited in the reaction is burned off with air. Conversion activity in relation to catalyst mass is favorable, thus beneficially affecting conversion capacity. Maximum interaction of adsorbate and support as is desirable in a cracking catalyst; e. g., magnesium or alumina with silica, is obtained by the monomolecular layer technique. Maximum exposure of the interaction complex to the reactants is provided. Product distribution is favorably affected by the uniform spacing of the active interfaces. Selectivity may be had by choice of the organic portion of the soap employed in the adsorption. Thus the use of hydroxyl, branch-chain structure, or ring substituents in the long organic chain of the soap gives control over horizontal spacing of the components of the oriented adsorbed film. The spacing advantageously is selected by size and shape of the soap according to the average size and shape of the hydrocarbon stock to be treated and the nature of the product desired. The effect may be related to the Pauling template effect since the stearate group is similar in many respects to a representative gas oil molecule of a cracking charge stock and the adsorption of aluminum or magnesium stearate may condition the catalyst surface for ready acceptance of the gas oil molecules.

In an illustrative example of the process, gas oil charging stock may be contacted at a cracking temperature with silica gel having an aluminum oxide monomolecular layer catalyst thereon deposited from a solution of aluminum mononaphthenate in the manner heretofore described. The gas oil is subjected to cracking, for example, by the fluid catalyst process, at a temperature within the approximate range of 800° to 1000° F. and usually at low pressure, e. g. 5 to 25 pounds per square inch. The spent catalyst is separated from the vapors and regenerated. The cracked products are fractionated to produce the desired fractions. Because of the uniform spacing of the alumina molecules in the monomolecular layer, more uniform cracking is obtained; a minimum quantity of catalytic material is required and maximum benefit from catalyst-support interaction forces for yielding active sites is obtained.

In another example of the process, iso-octenes may be converted to iso-octanes by hydrogenation. I may employ a nickel catalyst on a siliceous support, the catalyst being prepared by depositing a solution of a nickel salt of an organic, high molecular weight acid on the support and then destroying the organic portion of the molecule. The vaporized octene mixed with hydrogen and heated to the desired temperature, e. g. about 1000° F., is passed through a converter containing the catalyst. The product mixture from the converter is condensed and taken to an octane receiver for removal of unreacted hydrogen.

The process may also be employed for dehydrogenation using a catalyst composition conventionally employed for this purpose, such as chromium oxide on alumina. The catalyst is prepared as heretofore described by depositing a layer of a chromium salt of an organic, high molecular weight acid on the alumina and then oxidizing off the organic part of the molecule. In carrying out the process a charge of paraffins, such as a $C_4$ cut containing normal butane and isobutane, is heated in a furnace to dehydrogenation temperature, e. g. about 1200° F. The heated gases are then passed through a catalyst chamber or reactor in which the catalyst is arranged and in which the dehydrogenation takes place. The products from the catalyst chamber are cooled, compressed and passed to a separator. The liquid portion consisting mainly of butenes and unreacted butanes is separated from hydrogen and light gases. It is then taken to a fractionating system in which the butanes are separated from the butenes.

In a further example directed to reforming, a straight-run gasoline fraction is subjected to contact at reforming conditions with a platinum catalyst prepared by depositing a monomolecular layer of platinum on activated alumina by adsorption from a solution of a salt of platinum with an organic, high molecular weight acid and then treating the deposited material to remove the organic portion of the molecule. The reforming reaction is conducted at about 1000°–1100° F. under superatmospheric pressure with conventional handling of the catalyst, charge stream and product separation.

Other catalysts for use in hydrocarbon conversion processes may be prepared in the manner shown in the examples. Thus a catalyst for use in reforming may be prepared by depositing a monomolecular layer of platinum or palladium on activated carbon or mixed silica-alumina gel by adsorption from a solution of a salt of platinum or palladium, with an organic, high molecular weight acid, and then treating the deposited material to remove the organic portion of the molecule. Due to the high cost of platinum and palladium, my method of preparing such catalysts in the form of a monomolecular layer is particularly valuable, as a minimum of the precious metals is used in my process. A silica-magnesia cracking catalyst may be prepared by depositing a salt of magnesium with an organic, high molecular weight acid as a monomolecular layer on silica gel in particle form by adsorption from organic solution, and then treating the deposited material to remove the organic portion of the molecule and leave magnesium oxide. A catalyst consisting of an oxide of chromium on alumina gel similarly may be prepared by employing an organic, high molecular weight soap of chromium. A nickel hydrogenation catalyst may be similarly prepared by contacting granular or finely divided diatomaceous earth with an organic solution of an organic, high molecular weight soap of nickel where the nickel is in oxide form following removal of the organic matter, reduction is performed in the usual manner.

I claim:

1. In the production of metal-type solid adsorptive catalysts, the steps which include depositing a monomolecular layer of a metal-type catalyst on an adsorptive carrier surface in the form of a metallic salt of an organic, soap forming, high molecular weight aliphatic carboxylic acid selected from the group consisting of acyclic carboxylic acids and carbocyclic carboxylic acids by deposition from a solution of the sale in an inert vaporizable organic solvent, separating the solid material from the liquid solvent, drying the solid and treating the solid to decompose the organic portion of the adsorbed salt.

2. The method of claim 1 where the metal-type catalyst is platinum metal.

3. The method of claim 1 where the adsorptive carrier is alumina.

4. In the production of metal oxide-adsorbent gel type catalysts, the steps which include depositing a monomolecular layer of a metal oxide on the adsorptive surface of an adsorbent gel in the form of a salt of the metal of the oxide with an organic, soap forming, high molecular weight aliphatic carboxylic acid selected from the group consisting of acyclic carboxylic acids and carbocyclic carboxylic acids by agitating the adsorbent gel with a solution of the salt in an inert vaporizable organic solvent, separating the resulting gel with adsorbed salt from the liquid solvent, drying the solid and treating the solid to decompose the organic portion of the adsorbed salt.

5. The method of claim 4 in which the metal oxide is selected from the group consisting of alumina and magnesia, and the adsorbent gel is silica gel.

6. The method of claim 4 in which the metal oxide is alumina, and the adsorbent gel is silica gel.

References Cited in the file of this patent

UNITED STATES PATENTS

| | | |
|---|---|---|
| 1,511,520 | Rees | Oct. 14, 1924 |
| 2,123,732 | Keitel | July 12, 1938 |
| 2,257,157 | Connolly | Sept. 30, 1941 |
| 2,265,388 | Melaven et al. | Dec. 9, 1941 |
| 2,360,393 | Burrell | Oct. 17, 1944 |
| 2,479,110 | Haensel | Aug. 16, 1949 |
| 2,497,968 | Young et al | Feb. 21, 1950 |